United States Patent [19]
Tsuji et al.

[11] Patent Number: 5,459,621
[45] Date of Patent: Oct. 17, 1995

[54] METHOD AND APPARATUS FOR ROTARY-HEAD TYPE SIGNAL RECORDING AND REPRODUCING OF DIGITAL VIDEO/AUDIO SIGNALS

[75] Inventors: Shiro Tsuji, Minoo; Kunio Suesada, Ikoma; Tadashi Nakayama, Machida; Toshihiro Uehara, Kawasaki, all of Japan

[73] Assignees: Matsushita Electric Industrial Co., Ltd., Osaka; Nippon Hoso Kyokai, Tokyo, both of Japan

[21] Appl. No.: 273,158

[22] Filed: Jul. 22, 1994

Related U.S. Application Data

[63] Continuation of Ser. No. 56,936, May 5, 1993, abandoned, which is a continuation of Ser. No. 636,586, Jan. 2, 1991, abandoned.

[30] Foreign Application Priority Data

Jan. 9, 1990 [JP] Japan ......................................... 2-1771

[51] Int. Cl.$^6$ ................................ G11B 5/09; G11B 5/02
[52] U.S. Cl. ................................ 360/32; 360/48; 360/19.1
[58] Field of Search ............................... 360/32, 27, 19.1, 360/48, 64, 35.1, 38.1; 358/343, 341

[56] References Cited

U.S. PATENT DOCUMENTS

| | | | |
|---|---|---|---|
| 4,751,590 | 6/1988 | Wilkinson | 360/19.1 |
| 4,882,732 | 11/1989 | Kaminorga | 360/38.1 |
| 5,012,361 | 4/1991 | Chiba et al. | 360/38.1 |

FOREIGN PATENT DOCUMENTS

| | | |
|---|---|---|
| 0393207 | 10/1990 | European Pat. Off. |
| 3918454 | 12/1989 | Germany |
| 60-212871 | 10/1985 | Japan |
| 61-160803 | 7/1986 | Japan |
| 2164780 | 3/1986 | United Kingdom |
| 2220521 | 1/1990 | United Kingdom |

*Primary Examiner*—Andrew L. Sniezek
*Assistant Examiner*—W. Chris Kim
*Attorney, Agent, or Firm*—Stevens, Davis, Miller & Mosher

[57] ABSTRACT

Method and apparatus for recording a plurality of audio channels on segmented tracks of a tape by rotary heads. The audio channels to be recorded are allocated to recording sectors provided for the individual audio channels on the basis of the relation between the number of the audio channels and the number of the segmented tracks, so that each recording track necessarily includes the individual audio channel recording sectors uniformly distributed in the longitudinal direction of the tape, and the two-dimensional distance between the sectors on which the same audio channel is recorded can be maximized on the tape. Thus, an adverse effect of an error attributable to a dropout and/or a scar formed on the tape can be dispersed, thereby achieving high capability for error correction.

6 Claims, 6 Drawing Sheets

F I G. 3
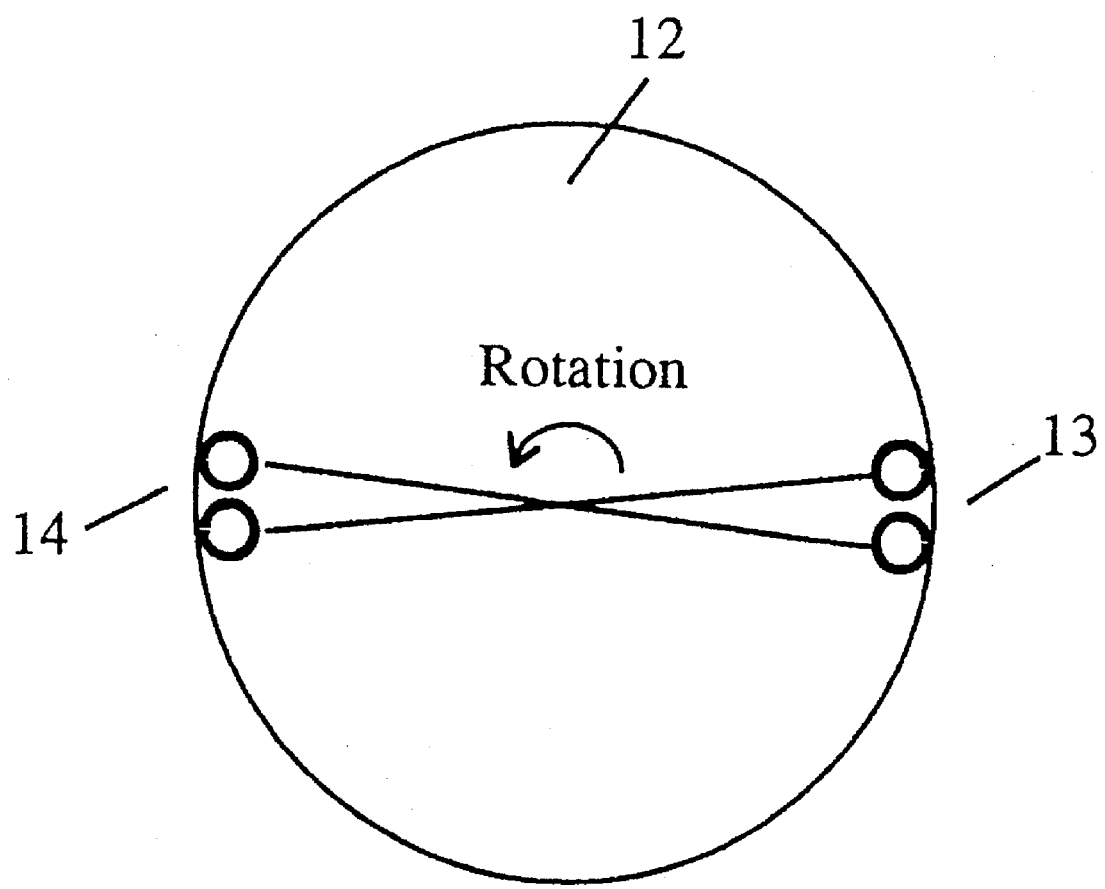

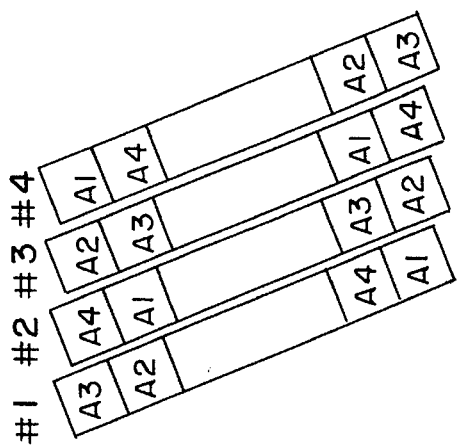
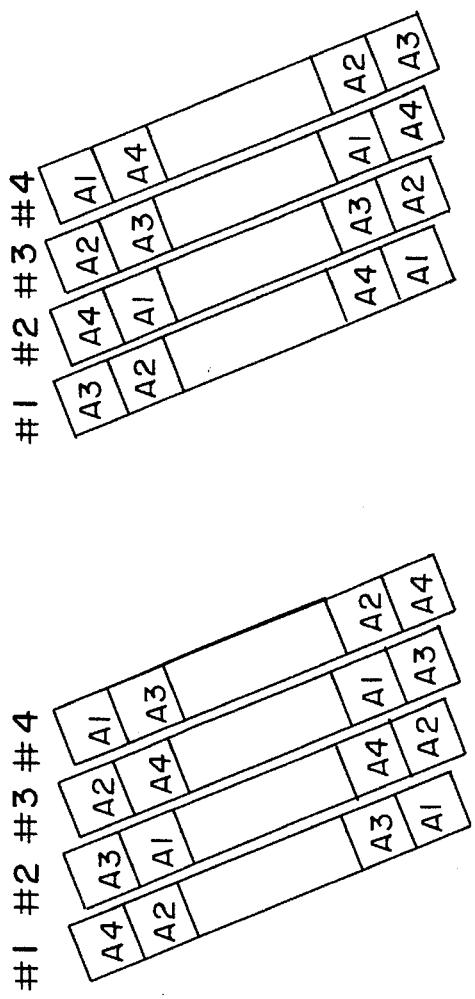
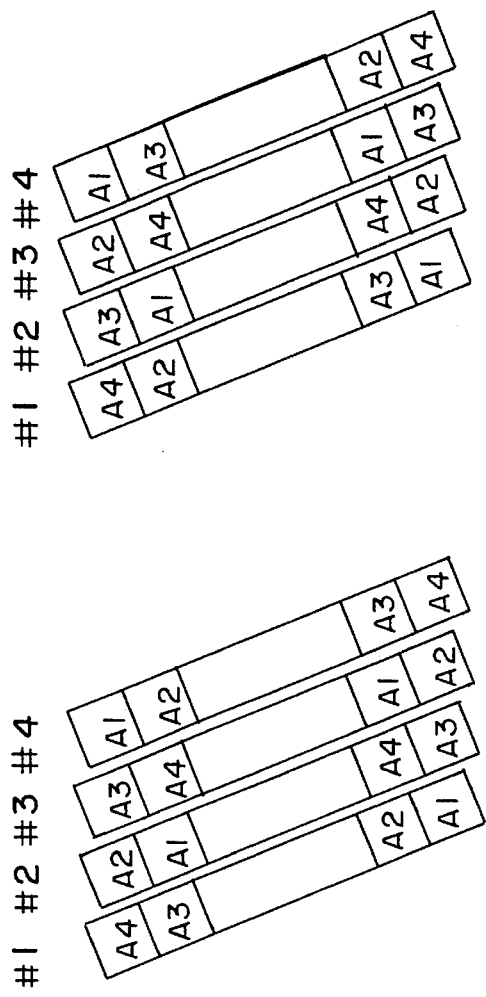
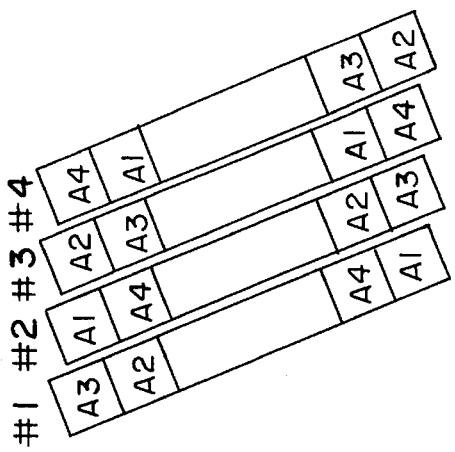
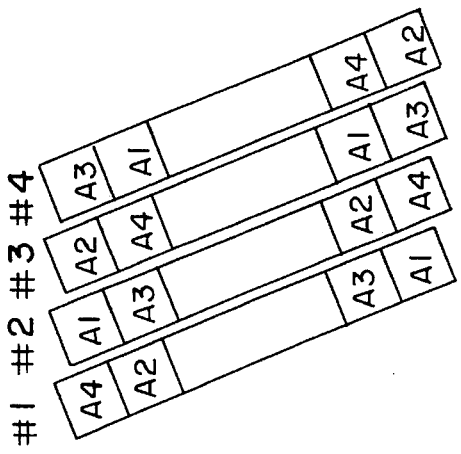
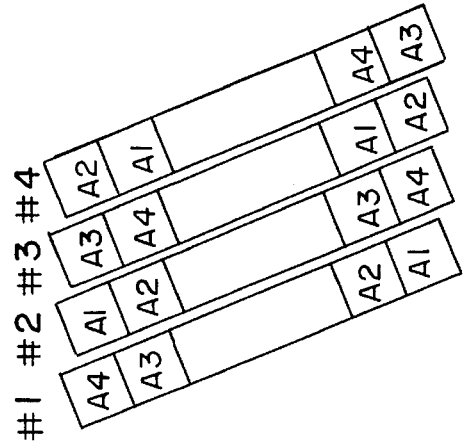

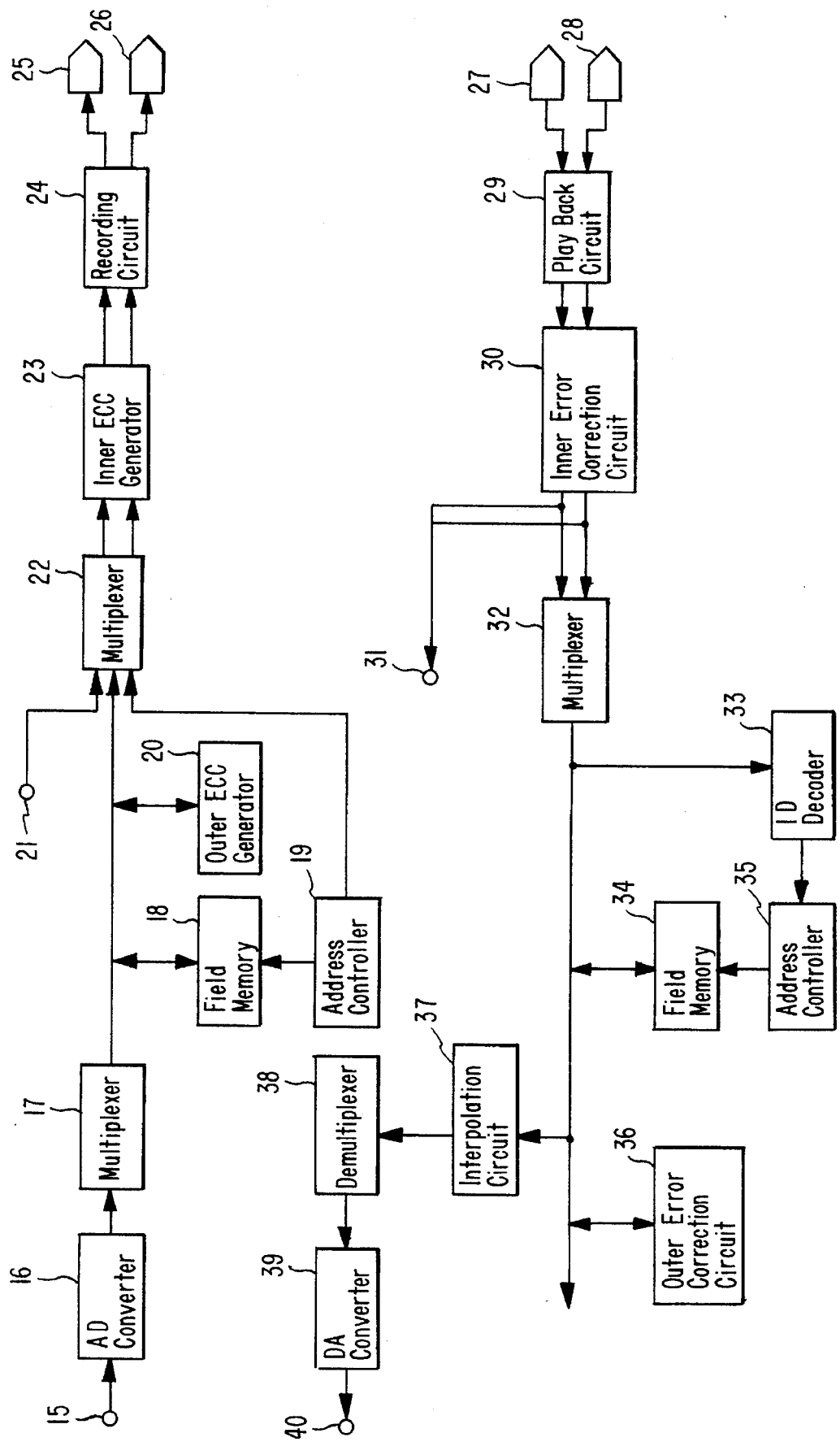

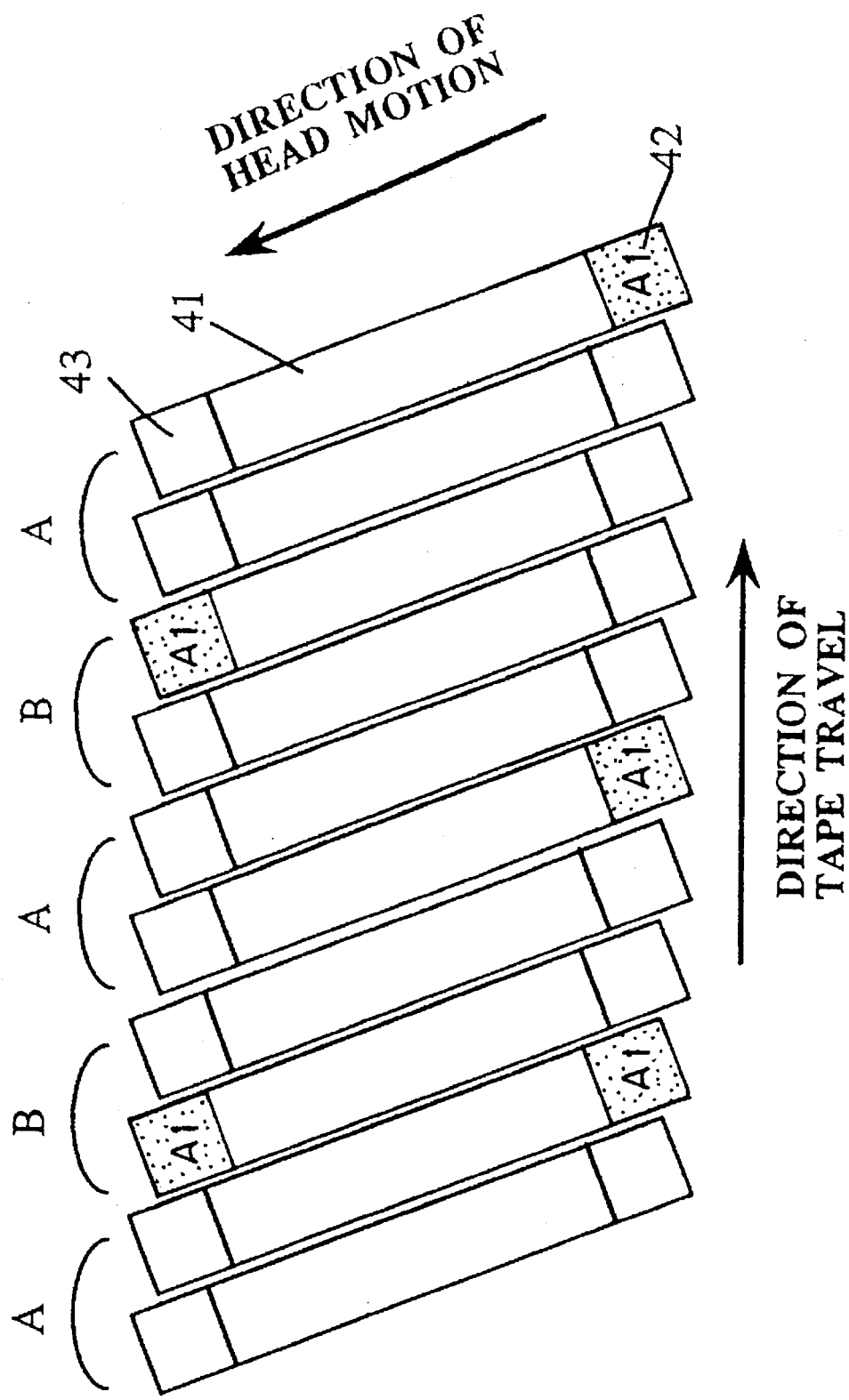

METHOD AND APPARATUS FOR ROTARY-HEAD TYPE SIGNAL RECORDING AND REPRODUCING OF DIGITAL VIDEO/AUDIO SIGNALS

This application is a continuation of application Ser. No. 08/056,936, filed May 5, 1993 (abandoned) which is a continuation of application Ser. No. 07/636,586, filed Jan. 2, 1991 (abandoned).

BACKGROUND OF THE INVENTION

1. Field of the Invention

This invention relates to a method for recording a digitized audio signal and the like on a recording medium loaded in a recording and reproducing apparatus of rotary head type and also relates to such a recording and reproducing apparatus.

2. Description of the Prior Art

With the progress of the LSI technology in recent years, digital processing of both audio signals and video signals has been greatly advanced. Audio visual apparatuses capable of recording and reproducing an audio signal and a video signal in a digitized form are now widely being put into practical use. Also, digital VTR's for both commercial and consumer use, are being widely used which record an audio signal and a video signal in a digital signal form. This is advantageous in that no degradation of the reproduction signal quality of a copy of the recording theoretically occurs. These digital recording apparatuses are designed so that, even when an error attributable to dropouts distributed on a recording medium occurs, such an error is corrected by the function of an error detection code which is added to recorded signal data to generate a reproduced output signal having the high quality equivalent to that of the analog input signal recorded on the recording medium after the A–D conversion.

In the case of the digital VTR described above, it is necessary that, for the purpose of high-fidelity reproduction of the original analog input signal, the signal is to be sampled at a sampling frequency two or more times as high as the frequency band of the original analog signal, and the number of quantized bits is to be selected to be as many as possible. Therefore, an extremely wide frequency band is required in the case of the digital VTR as compared to a conventional analog VTR of rotary head type, and signal recording with a high recording density is essentially required.

For the attainment of the desired high density recording, it is naturally required to shorten the recording wavelength and to narrow the width of the recording track. However, accumulation of highly advanced recording manufacturing technologies is needed for the attainment of the above requirements, and the desired high density recording with a density several times as high as the conventional density cannot be so easily attained.

Thus, a common practice now employed for the realization of the digital VTR is the multichannel recording of a signal by a plurality of heads, and the so-called segmented recording in which the rotary drum carrying the recording heads is driven at a high rotation speed so as to divisionally record the signal on a plurality of segmented regions of a recording medium.

On the other hand, the number of channels of an audio signal recorded on the recording medium in the digital VTR tends to be increased to four or more channels from the conventional two stereo channels. Especially, in the case of the digital VTR used for commercial service such as broadcasting service, the number of channels is preferably as many as possible, because it is convenient for the purpose of, for example, later editing.

The so-called $D_1$ and $D_2$ formats standardized by the SMPTE (The Society of Motion Picture and Television Engineers) are employed in broadcasting digital VTR's now in practical use. In these digital VTR's, four audio recording channels and both the multichannel recording technique and the segmented recording technique described above are used. That is, the recording region corresponding to one field period is divided into a plurality of segments. Further, in the case of the $D_1$ format, audio signals are recorded on areas at the center portion of a magnetic tape in a relation separated from video signals, while in the case of the $D_2$ format, audio signals are recorded on areas at both sides of a magnetic tape in a relation separated from a video signal. That is, according to each of these formats, audio recording regions in the form of independent sectors classified by the individual unit audio channels are provided on the tape so as to enable editing of audio information belonging to each audio channel, and a time-base compressed audio signal is recorded on the audio recording regions.

The problem encountered with the above manner of digital audio signal recording is the possible occurrence of burst-like dropouts attributable to dust particles, scars and the like that may be two-dimensionally distributed on the recording medium. In order to deal with such a problem, it is necessary to suitably arrange audio data and an error correction code so that resultant errors can be dispersed as much as possible and converted into correctable random errors. It is also necessary to allocate the individual audio channels to the recording sectors so that each of the audio channels has an equivalent and maximum error correction capability to withstand such an error.

A prior art example of such a system intended for attaining multichannel segmented recording of an audio signal by allocating a plurality of audio channels to a plurality of recording sectors is described in JP-A-61-160803 entitled "Digital Signal Recording System."

The cited patent application discloses a manner of arranging, on a tape, a plurality of recording sectors to which respective audio channels are allocated. In the disclosure of the citation, the relation between a specific head and an associated audio channel is considered so as to minimize an adverse effect attributable to possible clogging of the gap of the specific head.

FIG. 6 shows a second embodiment described and illustrated in the Japanese patent application cited above. In FIG. 6, the reference numeral 41 designates video signal recording sectors on a magnetic tape, and 42 and 43 designate audio signal recording sectors arranged on both sides respectively of each video signal recording track sector 41 at positions adjacent to the respective marginal edges of the tape. The hatching $A_1$ indicates each of the recording sectors of the first audio channel. The symbols A and B are used to distinguish the recording tracks formed by two-channel head pairs angularly spaced apart on a rotary drum by 180°.

The cited patent application describes that, by employment of the arrangement shown in FIG. 6, multichannel recording can be attained by the two-channel head pairs mounted on the rotary drum in the 180° spaced apart relation. It also describes that, by increasing the rotation speed of the rotary drum to a level five times as high as that used for conventional analog recording, four audio channels can be recorded on ten tracks per field. One of the audio channels shown in FIG. 6 will now be noted. It will be seen in FIG. 6 that the first audio channel is allocated to one of the two recording sectors so as to avoid the signal recording (reproduction) by the same single head only and so that the individual heads can uniformly participate in the signal recording (reproduction). It will also be seen in FIG. 6 that the recording sectors belonging to the first audio channel are spaced apart by a largest possible distance in the longitudinal direction of the tape so as to alleviate the adverse effect of a burst-like dropout.

Therefore, although occurrence of clogging of the gap of any one of the four heads will lead to the loss of ⅕ or ⅖ of information to be recorded on the individual tracks of the audio channels when the unit of the signal format is one field, audio information free from the adverse effect of dropouts can be reproduced by means of signal recovery according to error correction or by means of linear interpolation average of the preceding and succeeding sampled values on the basis of data recorded on the other sectors which are not adversely affected by the head clogging.

On the other hand, the television broadcasting system is broadly classified into the NTSC system and the PAL system. These two broadcasting systems are different in the required frequency band and the manner of chrominance signal processing due to the difference in the number of scanning lines and the field frequency. Therefore, an analog VTR for use for the NTSC system differs inevitably from that used for the PAL system. However, in the case of a digital VTR, there is not any great difference between that used for the NTSC system and that used for the PAL system in the way of signal processing except for the difference in the data recording capacity (the data transfer rate) in the stage of signal processing after digitizing. Therefore, a single digital VTR can be used for recording both the NTSC signal and the PAL signal by switching so as to deal with recording of either the NTSC signal or the PAL signal. In this case, in view of the frequency band and the field frequency, the NTSC system drives the rotary drum at the rotation speed of three times of 1,800 rpm of the conventional device, and the PAL system drives the rotary drum at the rotation speed of four times of 1,500 rpm of the conventional device, so as to achieve the signal recording by the two-channel four heads.

However, although the Japanese patent application cited above describes the basic idea with respect to the allocation of a plurality of audio channels to audio recording sectors according to the signal format in which one field is its unit, the citation does not clearly describe any concrete and universal rule which sets forth the optimum relation between the audio channels and the audio recording sectors. Also, the Japanese patent application cited above does not clearly describe a more concrete sector arrangement for the audio channels in which the aforementioned difference between the NTSC system and the PAL system is taken into consideration.

SUMMARY OF THE INVENTION

It is an object of the present invention to provide a digital audio signal recording method and a recording and reproducing apparatus in which a plurality of audio channels are allocated to a plurality of audio recording sectors in such a relation that each unit audio channel is allocated to one audio sector region in one track, so that, even when clogging of the gap of any one of heads, or a burst-like dropout such as a scar produced due to traveling movement of a tape may occur, the individual audio channels can exhibit a maximum error correction and error concealment capability under an equivalently effective condition. Another object of the present invention is to provide a highly practical and usable digital audio signal recording method and a recording and reproducing apparatus which can be applied in common to both the NTSC system, and the PAL system regardless of the differences between these two broadcasting systems.

The present invention provides, in a VTR of rotary head type including means for converting an M-channel (M≧2) analog audio signal into a digital audio signal, means for block dividing the digitized audio signal with a period corresponding to a unit period of a video signal such as one field period or one frame period, and means for dividing the recording area of a tape corresponding to the unit period of the video signal into N (N≧2) recording tracks each including video and audio signal recording regions and recording the video signal and the audio signal on the tape according to a recording pattern such that the audio signal is recorded on M regions which are different from the video signal recording region in each recording track and which are provided by dividing each recording track, except the video signal recording region, by the factor of M, a digital signal recording method comprising the steps of sequentially allocating the M-channel audio signal to the M recording regions according to period information given by the number of tracks L equal to a common multiple of M and N, and inserting an identification code for the track number information L into the digitized audio signal to be recorded.

BRIEF DESCRIPTION OF THE DRAWINGS

FIG. 3 shows the head arrangement on a rotary drum used in the embodiment of the method of the present invention.

FIGS. 4A to 4C-1 schematically show various tape format patterns preferably used in other embodiments of the method of the present invention.

FIG. 5 is a block diagram showing the structure of an embodiment of the recording and reproducing apparatus of the present invention.

FIG. 6 shows a tape format pattern of the prior art.

DESCRIPTION OF THE PREFERRED EMBODIMENTS

Figure 1:
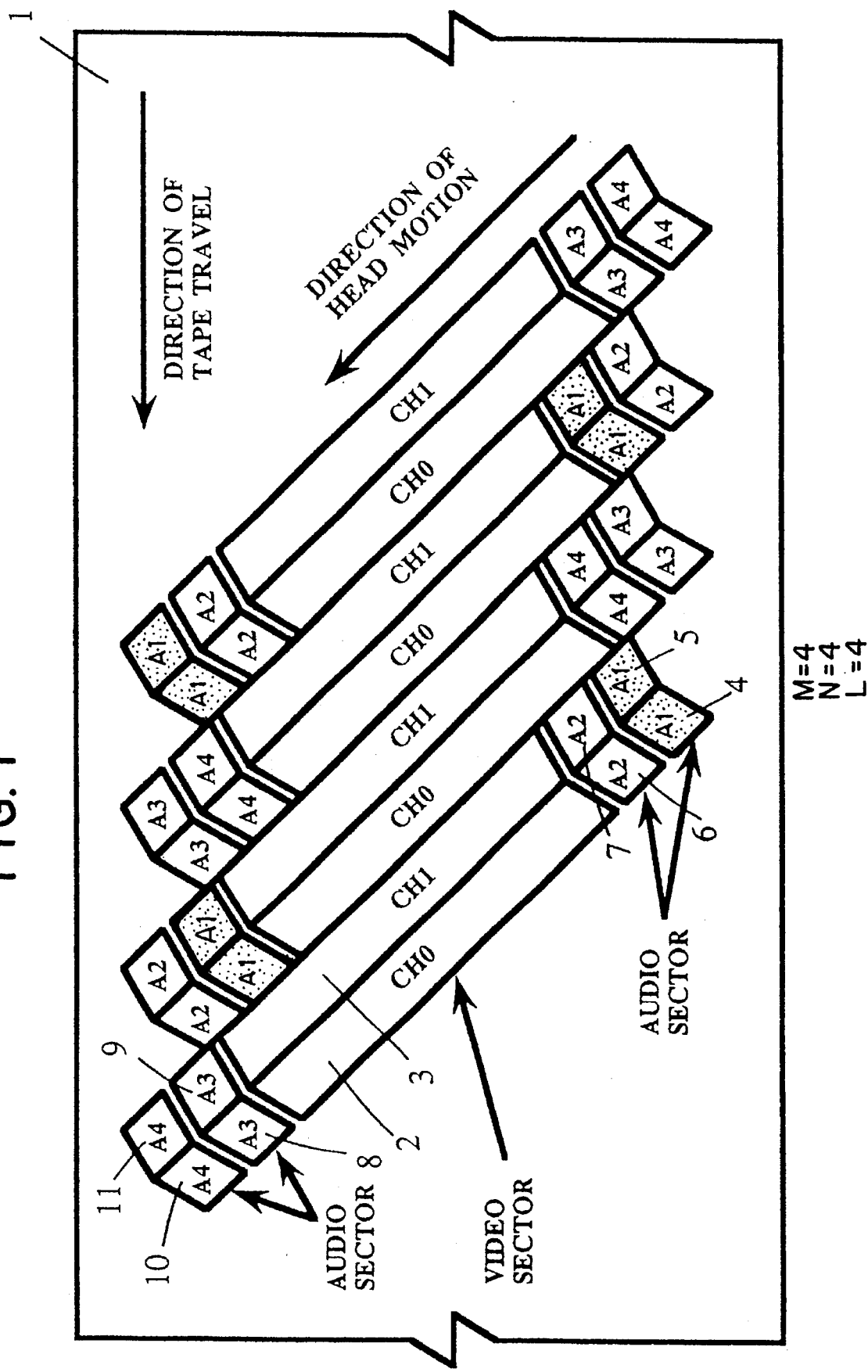
FIG. 1 shows a pattern of a recording tape format preferably used in an embodiment of the method of the present invention for signal recording according to the PAL system.

FIG. 1 shows a tape format pattern preferably used in an embodiment of the digital audio signal recording method of the present invention for signal recording according to the PAL system.

Figure 2:
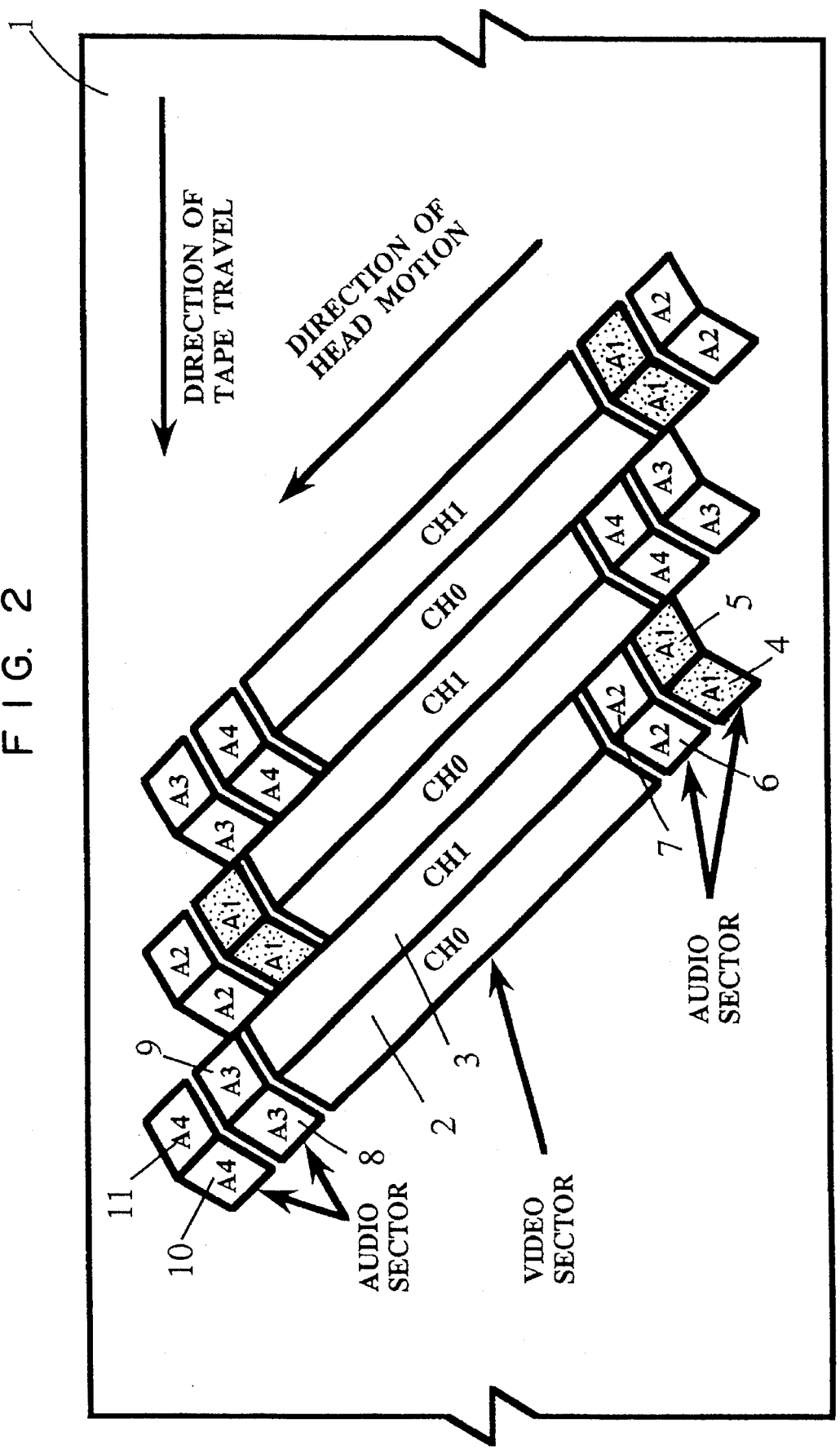
FIG. 2 shows a pattern of a recording tape format preferably used in the embodiment of the method of the present invention for signal recording according to the NTSC system.

FIG. 2 shows a tape format pattern preferably used in the embodiment of the digital audio signal recording method of the present invention for signal recording according to the NTSC system.

In FIGS. 1 and 2, recording track pairs of two channels CH0 and CH1 are formed on a recording tape 1. Video signal recording sectors 2 and 3 are shown formed on the first track pair counted from the left-hand side in FIG. 1, and audio signal recording sectors 4 to 11 are shown formed on extensions of the video signal recording sectors 2 and 3. The second and following track pairs are not numbered herein because video signal sectors and audio signal sectors are similarly arranged. At the audio signal recording sectors 4 to 11, four channels of the audio signal are recorded on regions A1, A2, A3 and A4 respectively. (The symbol A1 indicates the first audio channel, and the remaining symbols A2, A3 and A4 similarly indicate the second, third and fourth audio channels respectively.)

Thus, in each of the recording tape formats shown in FIGS. 1 and 2, the audio signal is recorded on the 2×2=4 independent sectors per track which are disposed at both marginal edge portions of the tape 1 to lie on the extensions of the video signal sector.

Heads used for the signal recording are arranged as shown in FIG. 3. Referring to FIG. 3, one recording head pair 13 and the other recording head pair 14 are mounted on a rotary drum 12 in a relation angularly spaced apart by 180° from each other so that these four heads participate in the recording operation. In the case of the NTSC system, the rotary drum 12 is driven at a rotation speed which is three times as high as the 1,800 rpm speed, of a conventional rotary drum, while in the case of the PAL system, the rotary drum 12 is driven at a rotation speed which is four times as high as the 1,500 rpm speed, of the conventional rotary drum. Thus, in the case of the NTSC system, the period of one field is covered by the three track pairs amounting to a total of six tracks, while in the case of the PAL system, the period of one field is covered by the four track pairs amounting to a total of eight tracks.

The audio sectors in the adjacent pair tracks CH0 and CH1 are allocated to the same audio channels respectively. Although this manner of allocation does not directly concern the present invention, this manner of track allocation is an effective means when there is a limitation in the improvement of the accuracy of tracking required for attaining the desired high recording density by narrowing the track width. That is, the allocation of the recording sectors of each of the audio channels to the pair of adjacent tracks is effective when an improvement in the mechanical accuracy is technically difficult or understandable in view the aspect of the cost. More precisely, when data of one channel only among the plural channels is to be edited, data recorded on at least the two adjacent tracks are simultaneously edited, so that a tracking error is dependent only on the accuracy of mounting the pair heads, on the rotary drum 12. Therefore, the above manner of track allocation is advantageous for minimizing an adverse effect on the S/N ratio of the reproduced signal due to undesired erasing of part of data recorded on the adjacent tracks which are not the object of the editing and also due to residue of data meant to be erased recorded on the tracks which are the object of the editing.

In each of the formats shown in FIGS. 1 and 2, the audio channels A1 to A4 are allocated to the respective recording sectors on the basis of the following two rules.

In the first place, in order that the adverse effect attributable to clogging of the gap of any one of the heads can be dispersed to the individual audio channels as much as possible, four audio recording sectors are provided for each recording track formed by one head and are allocated to four channel audio sectors. In other words, one recording track necessarily includes four channel audio sectors and does not include data of the same audio channel two or more times.

Secondly, in order to avoid the adverse effect attributable to a scar or scars produced in the longitudinal direction of the tape by, for example, the tape guide posts, the probability of existence of each of the audio channel recording sectors A1 to A4 in the longitudinal direction of the tape is made uniform over a long distance, and the distance between the sectors on which the same audio channel is recorded on the tape is selected to be a maximum.

According to the rules described above, the four audio channels are repeatedly allocated to the individual recording sectors in such a relation that the four track pairs correspond to one period of data recording. Thus, in the case of the format for the PAL system shown in FIG. 1, this period coincides with one field period. On the other hand, in the case of the format for the NTSC system shown in FIG. 2, this period is represented by a common multiple of three track pairs and four track pairs, that is, twelve track pairs which provide the four field period.

Other manners of sector arrangement according to the idea of the present invention include the sector arrangements shown in FIGS. 1 and 2 in the case of, for example, the four audio channel recording with the four track period are schematically shown in FIGS. 4A to 4C'. In this case, because the same audio channel is allocated to any one of the adjacent track pairs, such audio channels are not shown for the simplicity of illustration. Among FIGS. 4A and 4C', the sector arrangement shown in FIG. 4A is the same as those shown in FIGS. 1 and 2. FIG. 4A' shows the sector arrangement in which the order of the sectors A1, A2 and A3, A4 in each of the tracks #2 and #4 is exchanged from that shown in FIG. 4A. Further although not shown, exchange of any one of the sectors A1, A2 and A3, A4 in each of the tracks #2 and #4 is also effective. A total of four modifications can be made in the sector arrangement shown in FIG. 4A. In each of FIGS. 4B and 4B', the sector A3 is selected as the sector located next to the sector A1 in the track #1, and in each of FIGS. 4C and 4C', the sector A4 is selected as the sector located next to the sector A1 in the track #1. In each of FIGS. 4B, 4B', 4C and 4C', there are two selection modes for the third sector counted from the lowest first sector in the track #2, but such modes are not shown for the simplicity of illustration. Also, the sector A2, A3 or A4 can be selected in place of the lowest first sector A1 in the track #1, and there are thus four variations of the sector selection. Thus, there are a total of 6×2×4=48 variations including the illustrated six variations as variations of the sector arrangements shown in FIGS. 1 and 2. However, the aforementioned two rules apply in common to all of those variations, and, when any one of such formats is selected, there is not any functional difference between the formats from these two viewpoints. Therefore, the format according to the present invention is in no way limited to those shown in FIGS. 1 and 2, and various modifications can be made as shown in FIGS. 4A to 4C'.

The audio channel sector arrangement described above is advantageous in that a specific channel only is not damaged, even when clogging of the gap of any one of the heads may occur, or a scar or scars may be produced in the longitudinal direction of the tape during the traveling movement of the tape, or a dropout attributable to a large dust particle may appear in the recorded signal. The adverse effect attributable to such a cause is dispersed or distributed to a maximum extent between the channels so that it can be minimized to a very low level which can be eliminated by error correction or concealment without impairing the quality of the reproduced signal.

Further, even when the number of tracks may differ between the NTSC system and the PAL system, the rules of sector arrangement can be unified by the algorithm, so that a hardware part such as an address decoder constituting part of an address counter circuit for a field memory determining the sector arrangement can be used in common to both the NTSC system and the PAL system.

FIG. 5 is a block diagram schematically showing the structure of, especially, an audio signal processing system of a digital VTR in which an embodiment of the recording and reproducing apparatus of the present invention is incorporated, and, in FIG. 5, a video signal processing system having no direct concern with the present invention is not shown.

Referring now to FIG. 5, four channel analog audio input signal is applied through an input terminal 15 to a four-channel AD converter 16. The digitized four channel audio signals are time-division multiplexed in a first multiplexer 17, and the resultant audio signal is stored in a field memory 18 of two-page structure which is designed to store an audio signal contained in one field period of a video signal. An address controller 19 supplies write/read addresses to the field memory 18. An outer ECC (error correcting code) generator 20 generates an outer ECC code generated on the basis of a series of data ranging over individual blocks of the audio signal. A digitized video signal is applied through another input terminal 21 to a second multiplexer 22 together with the audio output signal from the first multiplexer 17 and an ID signal generated from the address controller 19 for the identification of the audio channel sector arrangement on a magnetic tape. In the second multiplexer 22, the video signal, the audio signal and the ID signal are switched and multiplexed to be converted into two system outputs corresponding to the pair tracks CH0 and CH1 respectively, and these output signals are applied to an inner ECC generator 23. The inner ECC generator 23 generates, for the video and audio signals, an inner ECC code on the basis of the series of data included in the blocks.

A recording circuit 24 is composed of a demodulator, a recording amplifier, etc. A pair of recording heads 25, 26 and a pair of reproducing heads 27, 28 are provided as signal recording and reproducing means respectively. A playback circuit 29 is composed of a playback amplifier, a wave shaping circuit, a clock regeneration circuit, a demodulation circuit, etc. An inner error correction circuit 30 corrects any error according to the inner ECC code. The video signal separated from the audio signal appears at an output terminal 31. In a third multiplexer 32, the reproduced audio signals of the two system corresponding to the pair tracks CH0 and CH1 respectively are combined into the single signal. An ID decoder 33 detects the ID code which is recorded together with the audio signal and used for identification of the audio channel sector arrangement.

A second field memory 34 and an associated second address controller 35 are disposed on the playback side, and the address controller 35 supplies write/read addresses to the field memory 34. An outer error correction circuit 36 corrects any error according to the outer ECC code. When errors that cannot be corrected are detected, the value representing the average of the values obtained by the preceding and succeeding sampling on the time base is computed by a modification circuit 37 for the purpose of linear interpolation, and this sampled value is interpolated in the reproduced audio signal. A demultiplexer 38 forms a pair with the multiplexer 17 and demultiplxes the time-division multiplexed audio signal into the four-channel audio signal. After being converted into the analog signal by a four-channel DA converter 39, the demultiplexed audio signal appears at a four-channel analog audio signal output terminal 40.

The operation of the processing system shown in FIG. 5 will now be described in detail. Four channel analog audio signals are applied through the input terminal 15 to the AD converter 16 in which each audio channel of the audio input signal is A–D converted. After the channel multiplexing by the time division processing in the multiplexer 17, the channel-multiplexed digital audio signal is temporarily written and stored in the field memory 18 according to its time domain at a rate in which the unit is one field. The write address at that time is supplied from the address controller 19. The field memory 18 is usually of the two page type, and, while the audio signal is being continuously written in one of the page memories, the audio signal stored in the other page memory is read out/written for the purpose of generation of the outer ECC code and also read out for the purpose of outputting the recorded audio signal. After the complete writing of the four channel audio signals of one field, the error correction code is generated on the basis of the audio data spaced apart on the time base. That is, the outer ECC generator 20 generates the outer ECC code on the basis of the audio signal read out from the field memory 18 in the order different from the time domain during writing. In the outer ECC code generator 20, the input signal train is divided by a predetermined generator polynomial to compute a residue polynomial, and this residue polynomial is added to the input signal train as an error correction code. Although this outer ECC code has no direct concern with the present invention and is not specifically defined herein, this code preferably has the largest possible intersymbol distance so that it can exhibit excellent capability for correction.

The generated outer ECC code is written in the field memory 18 again. After the generation of the outer ECC code is completed, the digital audio signal which is time-base compressed in a predetermined order different from the time domain of writing the audio signal and different also from the order of generation of the outer ECC code is read out from the field memory 18 at timing matching the timing of application of a video signal. That is, such a digital audio signal is read out together with the outer ECC code from the field memory 18 at such timing that the digital audio signal is recorded on both sides of the video signal as shown in FIGS. 1 and 2.

This order of reading out the audio signal from the field memory 18 corresponds to the specific manner of allocation of the individual audio channels to the sectors according to the present invention. The format used in the present invention is common to both the NTSC system and the PAL system. Therefore, as compared to the prior art in which separate formats are used for the NTSC and PAL systems respectively, the hardware used in the apparatus of the present invention does not include any useless parts. Especially, the read address decoder circuit in which its ROM and associated elements are frequently integrated into an LSI can be made compact to provide a great merit.

Further, in the present invention, the basic unit of the signal processed to generate the outer ECC code, etc. is one field. In the case of the NTSC system in which the audio channel sector arrangement changes with the four-field period, the address controller 19 preferably generates an ID signal used for identifying the segment number or field number, and this ID signal is preferably inserted, for example, in each ID area provided immediately behind each block synchronization data to be recorded together with the audio signal. This ID signal is required for the sector identification in the playback mode. This is because, when the sector arrangement is not accurately identified in the playback mode, the audio channels of the reproduced signal are intermixed, resulting in impossibility of generation of the normal reproduced signal.

The video signal applied through the input terminal 21, the audio signal read out from the field memory 18 and the ID signal generated from the address controller 19 are multiplexed and then divided into the two system signals in the multiplexer 22. When the video signal and the time-division multiplexed audio signal are applied to the inner ECC generator 23, the inner ECC code common to both the video signal and the audio signal is added to these signals. The output signals of the inner ECC generator 23 are modulated in the recording circuit 24 to be converted into recording current waveforms which are supplied, after 180° switching (not shown), to the recording pair heads 25 and 26 to drive the same.

The operation of the processing system in the playback mode will now be described. The signals reproduced by the reproducing pair heads 27 and 28 are applied to the playback circuit 29 having the integrated function of signal amplification, 180° switching, waveform equalization, waveform shaping, clock regeneration, demodulation, block synchronization detection/protection, etc. The resultant signals are applied to the inner error correction circuit 30. After the correction according to the inner ECC code based on the signals in the recorded blocks, the video signal and the multiplexed audio signal are separately processed. That is, the video signal is applied to the output terminal 31, while the two system audio signals are multiplexed into the single signal in the multiplexer 32. The multiplexed audio signal is then written in the playback-side field memory 34. This playback-side field memory 34 is of the two or three page type and has the capacity of storing one field. The order of reproduced signal writing in this field memory 34 corresponds to the order of reading in the record-side field memory 18.

On the other hand, the field number or the segment number recorded on the ID area of each block is decoded by the ID decoder 33, and the address controller 35 controls the address corresponding to the written audio channel, so that the reproduced audio signal applied to the field memory 34 can be written at the correct memory address. After writing of one field of the reproduced audio signal in the field memory 34 is completed, the address controller 35 supplies the same address of generation of the outer ECC code in the recording mode, and the signal is read out from the field memory 34 so as to execute error correction according to the outer ECC code. In the outer error correction circuit 36, the error correction according to the outer ECC code is executed on the signal read out from the field memory 34. In this error correcting operation, the reproduced signal is divided by the same generator polynomial as that used in the recording mode, and when the result does not include any residue, the reproduced signal is determined to be free from any error, while when the result includes a residue, the position of the error can be detected so that the error correction data can be produced on the basis of the value of the residue.

In the case of the format shown in FIG. 1, that is, in the case of the PAL system, ¼ of data belonging to each channel is lost among data recorded on four track pairs forming one field when clogging of the gap occurs in any one of the heads. However, the remaining ¾ of data belonging to each channel is valid, and error correction and recovery of the original data from the remaining data can be substantially sufficiently attained on the basis of the outer ECC code generated from the data ranging over the sectors. Similarly, in the case of the format for the NTSC system shown in FIG. 2 too, the original data can be substantially sufficiently recovered, even when ⅔ or ⅙ of data belonging to each channel is lost due to clogging of the gap of any one of the heads.

The audio data corrected according to the outer ECC code is written in the field memory 34 again. After the error correcting operation is completed, the four-channel audio signal is continuously read out in time division mode from the field memory 34 according to the write time series of the original audio data. Only when an uncorrectable error occurs, the modification circuit 37 operates to interpolate the average of the values obtained by the preceding and succeeding sampling on the time base. Then, the demultiplexer 38 demultiplexes the output signal of the interpolation circuit 37 into the digital audio signal of four parallel channels, and the DA converter 39 converts the digital audio signal into the analog audio signal, so that the four-channel analog audio signal appears at the output terminal 40.

It will be understood from the foregoing detailed description that the present invention is featured by the audio channel sector arrangement based on the simple algorithm, so that an adverse effect attributable to an elongate dropout such as a scar formed on a tape due to clogging of the gap of any one of the heads can be effectively dispersed and reduced to a correctable level, and so that the above excellent effect can be effectively exhibited regardless of the difference between the NTSC broadcasting system and the PAL broadcasting system, thereby simplifying the hardware too.

The aforementioned embodiment of the present invention has referred to the case where a four channel audio signal is recorded by two head pairs by rotating the rotary drum at a rotation speed three times as high as the conventional rotation speed in the case of the NTSC system and rotating the rotary drum at a rotation speed four times as high as the conventional rotation speed in the case of the PAL system. However, it is apparent that the above idea is universally applicable and can be easily extended to be applied to the case of audio recording and reproduction using any desired numbers of channels and tracks.

Suppose that M ($M \geq 2$) is the number of audio channels, N ($N \geq 2$) is the number of tracks per field period (or one frame period which is also the unit of the period of a video signal), and each track includes M audio recording sectors. Then, when the relation between M and N is given by N=M, the audio channels are allocated to the M recording sectors with the period of one field according to the aforementioned rules. In the case where the relation between M and N is given by N≠M, and N is undivisible by M, the number of tracks equal to a common multiple of N and M is selected as the period, and the audio channels are allocated to these recording sectors according to the aforementioned rules. In the case where the relation between M and N is given by N>M, and N is divisible by M, one field is selected as the period. In the case where the relation between M and N is given by N<M, and M is divisible by N, the M/N field period is selected to allocate the audio channels to the recording sectors.

In the conventional method, the audio channels are allocated to the recording sectors within the frame of one field so as to deal with occurrence of an elongate dropout attributable to clogging of the head gap or a scar formed on a magnetic tape. In contrast to the prior art, the audio channels are allocated to the recording sectors beyond the conventional frame of one field according to the method of the present invention, so that the abilities of connection and concealment can be more powerful. Therefore, the present invention is advantageous in that the individual audio channels can be placed under a completely identical condition, and both the error correction capability and the error concealment capability can be improved.

Further, regardless of the difference between the NTSC broadcasting system and the PAL broadcasting system, the hardware allocating the digitzed audio signal to the individual recording sectors can be used in common to both these two broadcasting systems, thereby greatly simplifying the algorithm and also greatly simplifying the structure of the recording and reproducing apparatus.

We claim:

1. A rotary head type digital audio signal recording and reproducing apparatus, comprising:

(a) means for converting an M-channel (M≧2) analog audio signal into an M-channel digital audio signal;

(b) first storing means for block dividing said M-channel digital audio signal into a plurality of blocks to provide a block divided digital audio signal, each of said blocks corresponding to a unit period of a video signal, said unit period being defined as one of one field period of said video signal and one frame period of said video signal, and for temporarily storing said plurality of blocks of said block divided digital audio signal;

(c) means for dividing a recording area of a tape into N (N≧2) recording tracks per said unit period of said video signal, each of said recording tracks including a video signal recording region and an audio signal recording region, said audio signal region being separate and different from said video signal recording region, and for dividing said audio signal recording region of said each recording track into M sectors per track, said M sectors being located at opposite ends of said video signal recording region so as to define M rows of audio sectors along a longitudinal direction of said tape;

(d) first control means for reading said plurality of blocks of said digital audio signal from said first storing means and allocating said M-channel digital audio signal sequentially to said M sectors of each of said tracks at a repetition period of L-number of tracks, where L is equal to a common multiple of M and N, such that (i) no more than one sector of a same audio channel of the M channels is disposed on a same track, (ii) each one of said M rows contains audio sectors for all of said M audio channels and an equal number of audio sectors for each one of said M audio channels are disposed in each of said M rows of sectors for said L-number of tracks, (iii) a distance between audio sectors in a same row of said M-rows containing the same audio channel corresponds to M audio sectors, and (iv) audio sectors containing the same audio channel, in adjacent tracks of said L-number tracks, are respectively disposed at opposite sides of the video signal recording regions of said adjacent tracks;

(e) recording means for recording the read-out digital audio signal on said tape in accordance with said allocation of said audio signal;

(f) reproducing means for selectively reproducing and detecting said digital audio signal recorded on the tape;

(g) second storing means for temporarily storing a reproduced digital audio signal for said unit period of said video signal;

(h) second control means for writing said reproduced signal to said second storing means, and for controlling reading from said second storing means to restore said M-channel digital audio signal; and (i) decoding means for converting a restored M-channel digital audio signal to said M-channel analog audio signal.

2. A rotary head type digital audio signal recording and reproducing apparatus according to claim 1, wherein said means for converting an M-channel analog signal into an M-channel digital audio signal converts said M-channel analog audio signal into a 4-channel (M=4) digital audio signal, said means for dividing a recording area of a tape divides said recording area of the tape into 6 (N=6) recording tracks per said unit period of one field of said video signal, and said first control means allocates said M-channel (M=4) digital audio signal to said M sectors of said each track at the repetition period of 12 tracks (L=12).

3. A rotary head type digital audio signal recording and reproducing apparatus according to claim 1, wherein said means for converting an M-channel analog signal into an M-channel digital audio signal converts said M-channel analog audio signal into a 4-channel (M=4) digital audio signal, said means for dividing a recording area of a tape divides said recording area of the tape into 8 (N=8) recording tracks per said unit period of one field of said video signal, and said first control means allocates said M-channel (M=4) digital audio signal to said M sectors of said each track at the repetition period of 8 tracks (L=8).

4. A method of recording a digital audio signal with a rotary head type recording apparatus, said method comprising the steps of:

(a) converting an M-channel (M≧2) analog audio signal into an M-channel digital audio signal;

(b) block dividing said digital audio signal into a plurality of blocks to provide a block divided digital audio signal, each of said blocks corresponding to a unit period of a video signal, said unit period being defined as one of one field period of said video signal and one frame period of said video signal;

(c) storing said plurality of blocks of said block divided digital audio signal;

(d) dividing a recording area of a tape into N (N≧2) recording tracks per said unit period of said video signal, each of said recording tracks including a video signal recording region and an audio signal recording region, said audio signal recording region being separate and different from said video signal recording region;

(e) dividing said audio signal recording region of each of said recording tracks into M sectors per one track, said M sectors being located at opposite ends of said video signal recording region so as to define M rows of audio sectors along a longitudinal direction of said tape;

(f) reading out said plurality of blocks of said digital audio signal stored in step (c) and allocating said M-channel digital audio signal sequentially to said M sectors of said each track at a repetition period of L-number of tracks, where L is equal to a common multiple of M and N, such that (i) no more than one sector of a same audio channel of the M channels is disposed on a same track, (ii) each one of said M rows contains audio sectors for all of said M audio channels and an equal number of audio sectors for each one of said M audio channels are disposed in each of said M rows of sectors for said L-number of tracks, (iii) a distance between audio sectors in a same row of said M-rows containing the same audio channel corresponds to M audio sectors, and (iv) audio sectors containing the same audio channel, in adjacent tracks of said L-number tracks, are respectively disposed at opposite sides of the video signal recording regions of said adjacent tracks; and (g) recording said read-out digital audio signal on said tape in accordance with said allocation of said audio signal.

5. A method of recording a digital audio signal with a rotary head type digital audio signal recording apparatus according to claim 4, wherein in step (a), said M-channel analog audio signal is converted into a 4-channel (M=4) digital audio signal, in step (d), said recording area of the tape is divided into 6 (N=6) recording tracks per said unit period of one field of said video signal, and in step (f), said M-channel (M=4) digital audio signal is allocated to said M sectors of said each track at the repetition period of 12 tracks (L=12).

6. A method of recording a digital audio signal with a rotary head type digital audio signal recording apparatus according to claim 4, wherein in step (a), said M-channel analog audio signal is converted into a 4-channel (M=4) digital audio signal, in step (d), said recording area of the tape is divided into 8 (N=8) recording tracks per said unit period of one field of said video signal, and in step (f), said M-channel (M=4) digital audio signal is allocated to said M sectors of said each track at the repetition period of 8 tracks (L=8).

* * * * *